United States Patent
Goto (10) Patent No.: US 10,352,222 B2
(45) Date of Patent: Jul. 16, 2019

(54) CONTROL APPARATUS FOR INTERNAL COMBUSTION ENGINE

(71) Applicant: TOYOTA JIDOSHA KABUSHIKI KAISHA, Toyota-shi, Aichi-ken (JP)

(72) Inventor: Isamu Goto, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 347 days.

(21) Appl. No.: 15/122,747

(22) PCT Filed: Feb. 24, 2015

(86) PCT No.: PCT/IB2015/000220
§ 371 (c)(1),
(2) Date: Aug. 31, 2016

(87) PCT Pub. No.: WO2015/132642
PCT Pub. Date: Sep. 11, 2015

(65) Prior Publication Data
US 2017/0248058 A1    Aug. 31, 2017

(30) Foreign Application Priority Data
Mar. 5, 2014    (JP) .................................. 2014-043207

(51) Int. Cl.
*F01N 9/00*    (2006.01)
*F02D 41/08*    (2006.01)
(Continued)

(52) U.S. Cl.
CPC ............. *F01N 9/002* (2013.01); *F01N 3/021* (2013.01); *F01N 3/0253* (2013.01);
(Continued)

(58) Field of Classification Search
CPC ...... F01N 9/002; F01N 13/0093; F01N 3/021; F01N 3/0253; F01N 3/02; F01N 3/00;
(Continued)

(56) References Cited

U.S. PATENT DOCUMENTS

2005/0060991 A1    3/2005 Tsutsumoto et al.
2006/0086085 A1 *  4/2006 Wang .................... F01N 3/0885
                                                                    60/295
(Continued)

FOREIGN PATENT DOCUMENTS

EP    2500537 A1    9/2012
JP    07-247916 A    9/1995
(Continued)

*Primary Examiner* — Laert Dounis
*Assistant Examiner* — Kelsey L Stanek
(74) *Attorney, Agent, or Firm* — Sughrue Mion, PLLC (57) ABSTRACT

A control apparatus for an internal combustion engine includes an electronic control unit. The electronic control unit is configured to: execute increasing a temperature of an exhaust gas control apparatus at a second temperature increase speed as a regeneration control when the temperature of the exhaust gas control apparatus is in a second temperature range; control the temperature of an exhaust gas control apparatus during an idle operation so as to be equal to or smaller than the temperature of the exhaust gas control apparatus when the internal combustion engine enters an idle operation state as a temperature increase suppression control when the temperature of the exhaust gas control apparatus during a regeneration control is in the second temperature range and the internal combustion engine is in the idle operation state.

6 Claims, 7 Drawing Sheets

(51) Int. Cl.
*F02D 41/02* (2006.01)
*F01N 3/021* (2006.01)
*F01N 3/025* (2006.01)
*F01N 13/00* (2010.01)
*F02D 41/40* (2006.01)

(52) U.S. Cl.
CPC ....... *F01N 13/0093* (2014.06); *F02D 41/029* (2013.01); *F02D 41/08* (2013.01); *F01N 2610/03* (2013.01); *F01N 2900/08* (2013.01); *F01N 2900/16* (2013.01); *F01N 2900/1602* (2013.01); *F01N 2900/1612* (2013.01); *F01N 2900/1631* (2013.01); *F02D 41/405* (2013.01); *F02D 2200/0802* (2013.01); *Y02T 10/47* (2013.01)

(58) Field of Classification Search
CPC ............. F01N 2610/03; F01N 2900/08; F01N 2900/16; F01N 2900/1602; F01N 2900/1612; F01N 2900/1631; F02D 41/029; F02D 41/08; F02D 41/405; F02D 2200/0802; Y02T 10/47
USPC .......................................................... 60/311
See application file for complete search history.

(56) References Cited

U.S. PATENT DOCUMENTS

| | | | |
|---|---|---|---|
| 2011/0146246 A1* | 6/2011 | Farman | F01N 3/0235 60/286 |
| 2016/0084184 A1* | 3/2016 | Biagini | F02D 41/1446 60/605.1 |
| 2017/0074181 A1* | 3/2017 | Goto | F02D 41/0235 |

FOREIGN PATENT DOCUMENTS

| | | |
|---|---|---|
| JP | 2000-080914 A | 3/2000 |
| JP | 2005-090458 A | 4/2005 |
| JP | 2005-113800 A | 4/2005 |
| JP | 2005201061 A | 7/2005 |
| JP | 2008-303835 A | 12/2008 |
| JP | 2009-002259 A | 1/2009 |
| JP | 2010-229916 A | 10/2010 |
| JP | 2013029038 A | 2/2013 |
| JP | 2015-169105 A | 9/2015 |
| WO | 2011/055456 A1 | 5/2011 |
| WO | 2013014514 A2 | 1/2013 |
| WO | 2015/132646 A1 | 9/2015 |

\* cited by examiner

CONTROL APPARATUS FOR INTERNAL COMBUSTION ENGINE

BACKGROUND OF THE INVENTION

1. Field of the Invention

The invention relates to a control apparatus for an internal combustion engine.

2. Description of Related Art

There is known a technique of regenerating an exhaust gas control apparatus by supplying fuel to the exhaust gas control apparatus so as to burn a particulate matter accumulated on the exhaust gas control apparatus. Japanese Patent Application Publication No. 2010-229916 (JP 2010-229916 A), Japanese Patent Application Publication No. 2005-090458 (JP 2005-090458 A), PCT International Publication No. WO 2011/055456 (WO 2011/055456), Japanese Patent Application Publication No. 07-247916 (JP 07-247916 A), Japanese Patent Application Publication No. 2009-002259 (JP 2009-002259 A), Japanese Patent Application Publication No. 2005-113800 (JP 2005-113800 A), Japanese Patent Application Publication No. 2000-080914 (JP 2000-080914 A), and Japanese Patent Application Publication No. 2008-303835 (JP 2008-303835 A) disclose techniques of regenerating the exhaust gas control apparatus.

SUMMARY OF THE INVENTION

If the temperature of the exhaust gas control apparatus reaches a certain temperature when the exhaust gas control apparatus is regenerated, there is a case where a sulfuric compound accumulated on the exhaust gas control apparatus is separated therefrom so that white smoke is generated. In particular, when the internal combustion engine enters an idle operation state in the temperature range of the exhaust gas control apparatus that causes the separation of the sulfuric compound, the flow rate of the exhaust gas decreases compared to the value obtained before the idle operation state. However, the sulfuric compound separation amount does not decrease, and the concentration of the sulfuric compound in the exhaust gas increases. As a result, it becomes a state where white smoke is easily generated.

The invention provides a control apparatus for an internal combustion engine that suppress white smoke from being generated in an idle operation state.

According to an aspect of the invention, there is provided a control apparatus for an internal combustion engine. The internal combustion engine includes an exhaust gas control apparatus provided in an exhaust passageway of the internal combustion engine and a fuel supply apparatus configured to supply fuel to the exhaust gas control apparatus. The control apparatus includes an electronic control unit. The electronic control unit is configured to: (a) control the supply of fuel by the fuel supply apparatus as a regeneration control such that a temperature of the exhaust gas control apparatus is increased and a particulate matter accumulated on the exhaust gas control apparatus is burned; (b) execute increasing the temperature of the exhaust gas control apparatus at a first temperature increase speed as the regeneration control when the temperature of the exhaust gas control apparatus is in a first temperature range; (c) execute increasing the temperature of the exhaust gas control apparatus at a second temperature increase speed as the regeneration control when the temperature of the exhaust gas control apparatus is in a second temperature range, the second temperature increase speed being slower than the first temperature increase speed, the second temperature range being higher than the first temperature range; (d) execute burning the particulate matter by maintaining the temperature of the exhaust gas control apparatus in a third temperature range as the regeneration control when the temperature of the exhaust gas control apparatus is in the third temperature range, the third temperature range being higher than the second temperature range; and (e) control the temperature of the exhaust gas control apparatus during an idle operation so as to be equal to or smaller than the temperature of the exhaust gas control apparatus at the time when the internal combustion engine enters an idle operation state as a temperature increase suppression control when the temperature of the exhaust gas control apparatus during the regeneration control is in the second temperature range and the internal combustion engine is in the idle operation state.

The electronic control unit may be configured to decrease an amount of the fuel supply during the idle operation compared to the amount of the fuel supply at the time when the internal combustion engine enters the idle operation state as the temperature increase suppression control.

The electronic control unit may be configured to execute an exhaust gas temperature suppression control of suppressing the temperature of the exhaust gas as the temperature increase suppression control.

The electronic control unit may be configured not to execute the temperature increase suppression control when the temperature of the exhaust gas control apparatus is in the second temperature range, the internal combustion engine enters the idle operation state, and a vehicle speed is equal to or faster than a predetermined value.

The electronic control unit may be configured to, when a sulfuric compound accumulation amount is equal to or larger than a predetermined value, control the temperature of the exhaust gas control apparatus such that the temperature of the exhaust gas control apparatus is lower than that of a case where the sulfuric compound accumulation amount is smaller than the predetermined value as the temperature increase suppression control. The sulfuric compound accumulation amount is an amount of a sulfuric compound accumulated on the exhaust control apparatus.

The electronic control unit may be configured to, when the sulfuric compound accumulation amount is equal to or larger than the predetermined value, control the fuel supply amount of the fuel supply apparatus such that the fuel supply amount is smaller than that of a case where the sulfuric compound accumulation amount is smaller than the predetermined value as the temperature increase suppression control.

It is possible to provide the control apparatus for the internal combustion engine that suppresses white smoke from being generated in the idle operation state.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
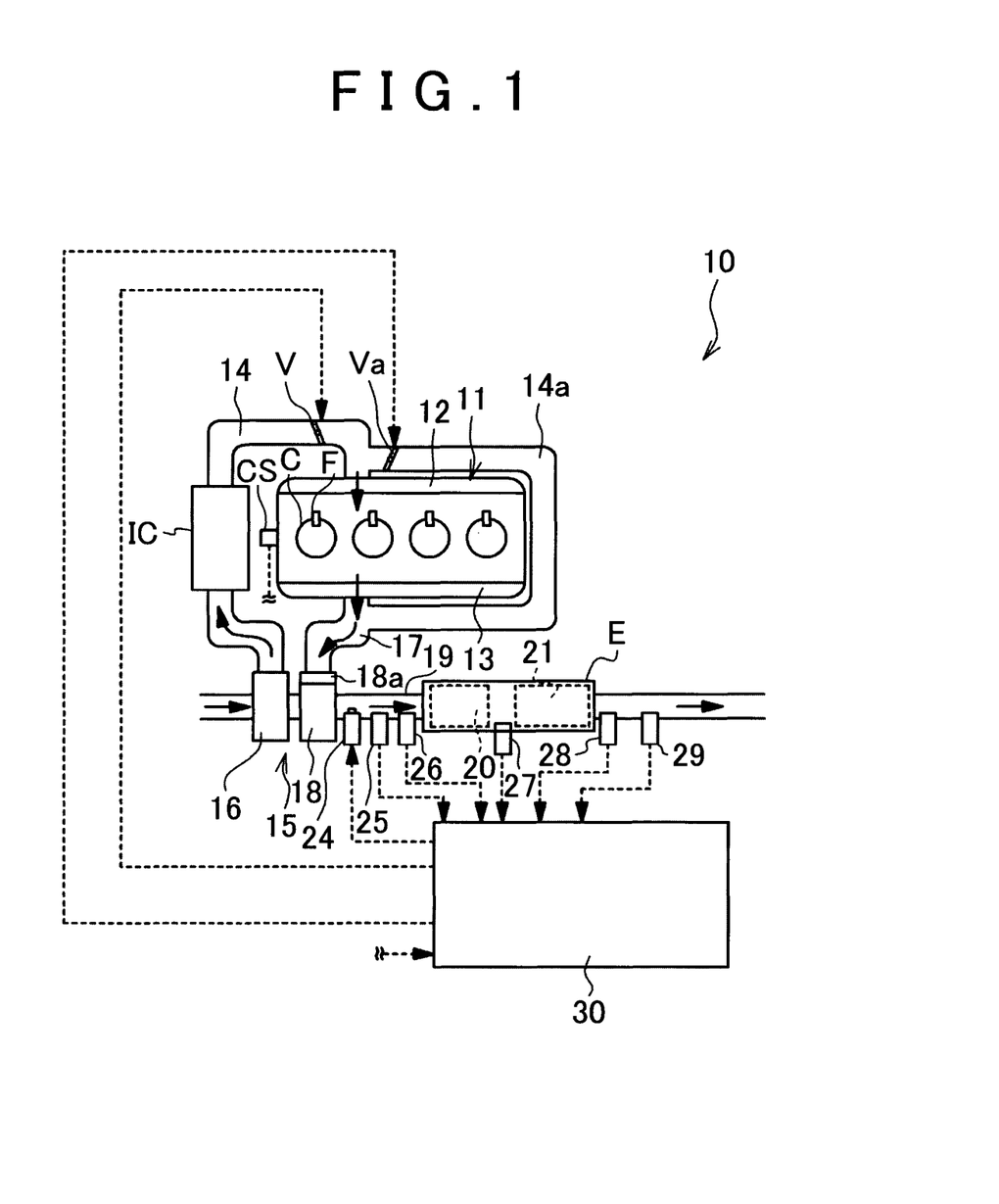
FIG. 1 is a diagram illustrating an engine system of an embodiment.

FIG. 1 is a diagram illustrating an engine system 10 according to an embodiment. A diesel engine (hereinafter, referred to as an engine) 11 includes an intake manifold 12 and an exhaust manifold 13. The intake manifold 12 is connected to an outlet of a compressor 16 of a turbocharger 15 through an intake passageway 14. The intake passageway 14 is equipped with an intercooler IC that cools intake air and a throttle valve V that adjusts an air intake amount with respect to the engine 11. The exhaust manifold 13 is connected to an inlet of an exhaust turbine 18 of the turbocharger 15 through an exhaust passageway 17. A variable nozzle vane 18a is provided at the inlet of the exhaust turbine 18. The flow rate of the exhaust gas that passes through the exhaust turbine 18 may be adjusted in response to the opening degree of the variable nozzle vane 18a. The outlet of the exhaust turbine 18 is connected to an exhaust passageway 19. The exhaust gas that is generated from the engine 11 is discharged to the exhaust passageway 19 through the exhaust turbine 18. The engine 11 includes four cylinders C and four fuel injection valves F that directly and respectively inject fuel into the four cylinders C, but the invention is not limited thereto. An EGR (Exhaust Gas Recirculation) passageway 14a is connected between the intake passageway 14 and the exhaust passageway 17. The EGR passageway 14a is equipped with an EGR valve Va. The engine 11 is equipped with a crank angle sensor CS that detects the engine rotation number.

The exhaust passageway 19 is equipped with an exhaust gas control apparatus E that purifies an exhaust gas. A DOC (Diesel Oxidation Catalyst) 20 and a DPF (Diesel Particulate Filter) 21 are provided inside the exhaust gas control apparatus E in order from the upstream side to the downstream side. The DOC 20 is an oxidation catalyst that oxidizes HC, NO, and CO contained in the exhaust gas so as to be converted into $H_2O$, $CO_2$, and $NO_2$. The DPF 21 traps a particulate matter contained in the exhaust gas. The exhaust gas control apparatus E is an example of the exhaust gas control apparatus.

A fuel adding valve 24, an SOx sensor 25, and a temperature sensor 26 are provided in the exhaust passageway 19 between the exhaust turbine 18 and the DOC 20. The SOx sensor 25 detects a sulfur concentration in the exhaust gas flowing through the DOC 20. The fuel adding valve 24 adds fuel used to burn the particulate matter accumulated on the DPF 21 into the exhaust gas. The temperature sensor 26 detects the temperature of the exhaust gas flowing into the DOC 20.

A temperature sensor 27 is provided in the exhaust passageway 19 between the DOC 20 and the DPF 21. The temperature sensor 27 detects the temperature of the exhaust gas which passes through the DOC 20 and flows into the DPF 21. A temperature sensor 28 and an air-fuel ratio sensor 29 are provided in the exhaust passageway 19 at the downstream side of the DPF 21. The temperature sensor 28 detects the temperature of the exhaust gas passing through the DPF 21. The air-fuel ratio sensor 29 detects the air-fuel ratio of the exhaust gas that passes through the DPF 21.

The ECU (Electronic Control Unit) 30 controls the entire engine system 10. The ECU 30 is a computer including a ROM (Read Only Memory), a RAM (Random Access Memory), a CPU (Central Processing Unit), and the like which are not illustrated in the drawings. The ECU 30 is electrically connected to the throttle valve V and the EGR valve Va, or the above-described sensors.

The ECU 30 determines whether the rotation number of the engine 11 enters an idle operation state in which the rotation number of the engine becomes the idle rotation number based on the value output from the crank angle sensor CS. The idle rotation number includes all rotation number ranges when the engine 11 enters the idle operation state. For example, the idle rotation number includes the target rotation number and the rotation number that changes to the target rotation number. Further, the idle operation state also includes, for example, not only a vehicle stop state, but also a low-speed travel state or a speed reduction state.

The ECU 30 estimates the sulfur concentration in fuel based on the values output from the SOx sensor 25 and the like, but the invention is not limited thereto. A fuel property sensor may be provided in a fuel tank so as to directly detect the sulfur concentration in fuel. Further, the sulfur concentration in fuel which is used in a place where the engine system 10 is used may be stored in advance in the ECU 30.

The ECU 30 detects the temperature of the exhaust gas control apparatus E based on the measurement values of the temperature sensors 26, 27, and 28. Furthermore, temperature sensors may be directly provided in the DOC 20 and the DPF 21 so as to detect the temperature thereof. Each of the temperature sensors 26, 27, and 28 is an example of a detection unit that detects the temperature of the exhaust gas control apparatus. Furthermore, the temperature of the exhaust gas control apparatus may be estimated from the operation state of the engine 11.

The ECU 30 estimates the amount of the particulate matter flowing into the DPF 21 based on the operation state of the engine 11, and estimates the amount of the particulate matter accumulated on the DPF 21 by the accumulation thereof. Furthermore, a sensor that detects the particulate matter may be provided in the DPF 21, and the ECU 30 may estimate the amount of the particulate matter accumulated on the DPF 21 based on the measurement value of the sensor.

The ECU 30 executes a regeneration control of regenerating the DPF 21 by burning the particulate matter accumulated on the DPF 21. In the regeneration control, the ECU 30 controls the amount of the fuel added from the fuel adding valve 24 and increases the temperature of the exhaust gas control apparatus at a predetermined temperature increase speed so as to burn the particulate matter. The fuel adding valve 24 is an example of the fuel supply apparatus that supplies fuel to the exhaust gas control apparatus E. Furthermore, a method of supplying the fuel to the exhaust gas control apparatus E and increasing the temperature thereof so as to burn the particulate matter is not limited thereto. For example, unburnt fuel may be supplied to the exhaust gas control apparatus E so as to burn the particulate matter accumulated on the DPF 21 by performing the post injection of the fuel injection valve F after the main injection thereof. In this case, the fuel injection valve F is an example of the fuel supply apparatus.

Although it will be described in detail later, the ECU 30 may selectively execute one of the normal regeneration control and the slow regeneration control as the regeneration control. The normal regeneration control is a control that burns the particulate matter by increasing the temperature of the exhaust gas control apparatus in a short time for the purpose of suppressing degradation in fuel efficiency. The slow regeneration control is a control that burns the particulate matter by slowly increasing the temperature of the exhaust gas control apparatus for the purpose of suppressing the generation of white smoke.

Figure 2A:
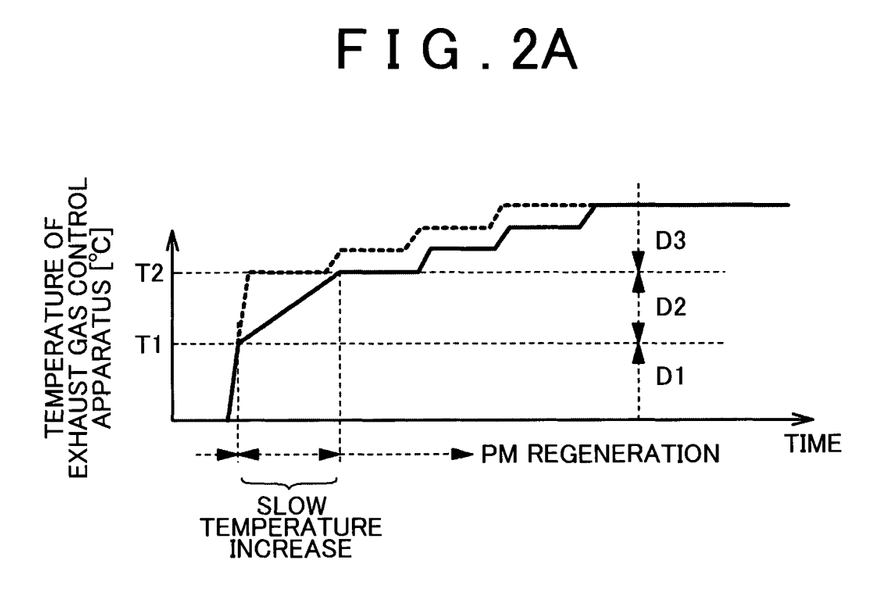
FIG. 2A is a graph illustrating a change in temperature of an exhaust gas control apparatus during a regeneration control.
Figure 2B:
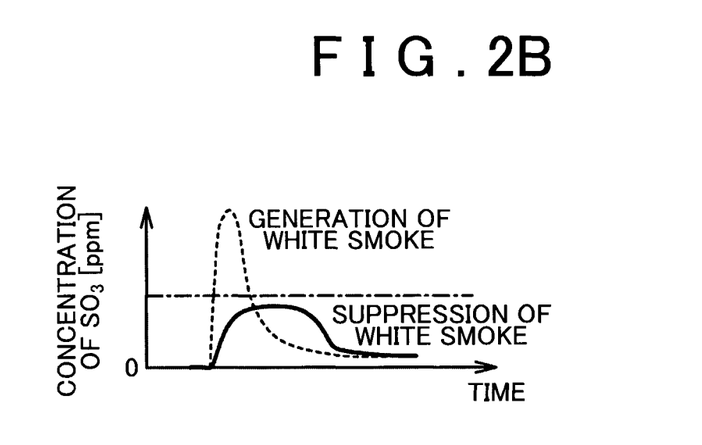
FIG. 2B is a graph illustrating a change in concentration of $SO_3$ in an exhaust gas during the regeneration control.

Next, a case will be described in which white smoke is generated during the regeneration control. FIG. 2A is a graph illustrating a change in temperature of the exhaust gas control apparatus during the regeneration control. FIG. 2B is a graph illustrating a change in concentration of $SO_3$ in an exhaust gas during the regeneration control. In FIGS. 2A and 2B, a change in temperature of the exhaust gas control apparatus and a change in concentration of $SO_3$ during the normal regeneration control are indicated by the dotted line, and a change in temperature of the exhaust gas control apparatus and a change in concentration of $SO_3$ during the slow regeneration control are indicated by the solid line. Further, in FIG. 2B, the concentration of $SO_3$ in which the exhaust gas starts to be visually recognized as white smoke is indicated by the one-dotted chain line.

A case will be supposed in which the regeneration control is executed in a case where a certain degree of the sulfuric compound is accumulated on the DOC 20 and the DPF 21 and the sulfur concentration in fuel is not low. Here, the temperature range of T1 to T2 illustrated in FIG. 2A is a temperature range in which the sulfuric compound separation amount from the DOC 20 and the DPF 21 further increases compared to the other temperature range. That is, the temperature T1 is a temperature in which the sulfuric compound separation amount starts to increase. When the temperature is equal to or higher than the temperature T2, the particulate matter accumulated on the DPF 21 is burned. A temperature which is lower than the temperature T1 will be referred to as a first temperature range D1, a temperature which is equal to or higher than the temperature T1 and is lower than T2 will be referred to as a second temperature range D2, and a temperature which is equal to or higher than the temperature T2 will be referred to as a third temperature range D3 (hereinafter, simply referred to as a temperature range). Furthermore, the temperature T1 is, for example, 450°, and the temperature T2 is 650°.

In the normal regeneration control, the temperature of the exhaust gas control apparatus is promptly increased at a substantially constant temperature increase speed until the temperature of the exhaust gas control apparatus reaches the temperature T2 at which the particulate matter starts to be burned. After the temperature of the exhaust gas control apparatus reaches the temperature T2, the particulate matter is burned by maintaining the temperature of the exhaust gas control apparatus in the temperature range D3 during a predetermined period. Furthermore, the particulate matter is burned by increasing the temperature of the exhaust gas control apparatus stage by stage in the temperature range D3. The temperature range D2 is a temperature range in which the sulfuric compound separation amount from the DOC 20 and the DPF 21 increases. For this reason, white smoke is generated when the temperature of the exhaust gas control apparatus is in the temperature range D2 and the temperature increase speed is fast. The reason why white smoke is generated is assumed that the amount of the sulfuric compound (SOx) separated from the DOC 20 and the DPF 21 increases when the temperature of the exhaust gas control apparatus reaches a predetermined value or more, $SO_3$ in the exhaust gas is combined with $H_2O$, and mist of $H_2SO_4$ is discharged as white smoke. If the temperature increase speed of the temperature of the exhaust gas control apparatus is fast when the temperature of the exhaust gas control apparatus is in the temperature range D2 as in the normal regeneration control, the sulfuric compound separation amount per unit time increases, and the concentration of $SO_3$ in the exhaust gas increases. Thus, the exhaust gas is visually recognized as white smoke.

In the slow regeneration control, the temperature of the exhaust gas control apparatus is increased at the temperature increase speed slower than the temperature increase speed of the normal regeneration control when the temperature of the exhaust gas control apparatus is in the temperature range D2. Thus, it is possible to suppress the sulfuric compound separation amount per unit time so as to be smaller than a predetermined value, and hence to suppress the concentration of $SO_3$ in the exhaust gas. As a result, it is possible to suppress a problem in which the exhaust gas is visually recognized as white smoke. Specifically, in the slow regeneration control, the temperature of the exhaust gas control apparatus is increased at a first temperature increase speed when the temperature of the exhaust gas control apparatus is in the temperature range D1. Thus, the degradation in fuel efficiency is suppressed by causing the temperature of the exhaust gas control apparatus to promptly reach the temperature T1. When the temperature of the exhaust gas control apparatus is in the temperature range D2, the temperature of the exhaust gas control apparatus is increased at a second temperature increase speed slower than the first temperature increase speed. Thus, the generation of white smoke may be suppressed by suppressing the concentration of $SO_3$ in the exhaust gas. When the temperature of the exhaust gas control apparatus is in the temperature range D3, the temperature of the exhaust gas control apparatus is maintained in the temperature range D3 during a predetermined period. Thus, the particulate matter accumulated on the DPF 21 is burned. Furthermore, in the normal regeneration control, the temperature of the exhaust gas control apparatus is increased at the first temperature increase speed when the temperature of the exhaust gas control apparatus is in the temperature range D1 or the temperature range D2.

Further, although it will be described in detail later, the ECU 30 executes a temperature increase suppression control of suppressing an increase in temperature of the exhaust gas control apparatus of the idle operation when the temperature of the exhaust gas control apparatus is in the temperature range D2 and the engine 11 enters the idle operation state during the slow regeneration control. The temperature increase suppression control is a control that suppresses the generation of white smoke when the engine 11 enters the idle operation state during the slow regeneration control.

Figure 3A:
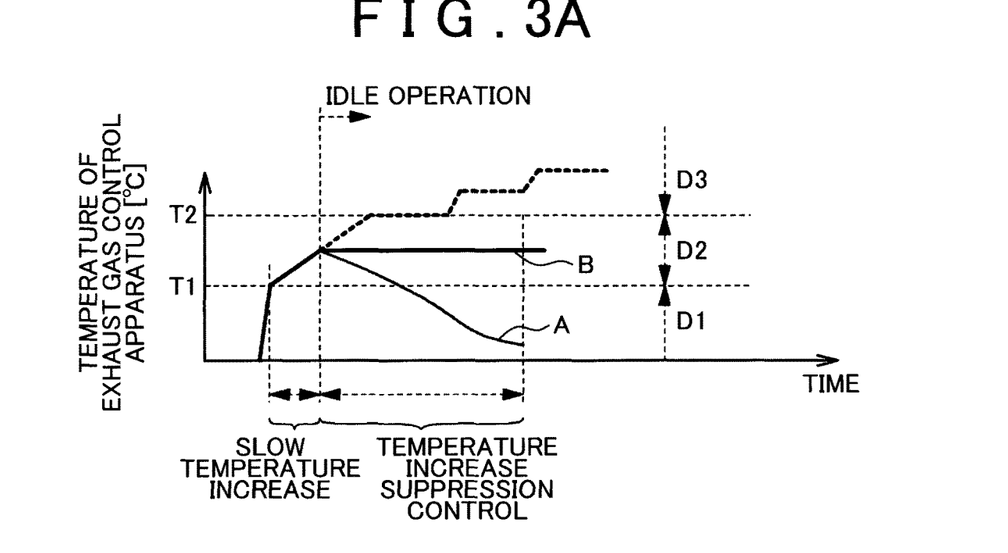
FIG. 3A is a graph illustrating a change in temperature of the exhaust gas control apparatus during a temperature increase suppression control.
Figure 3B:
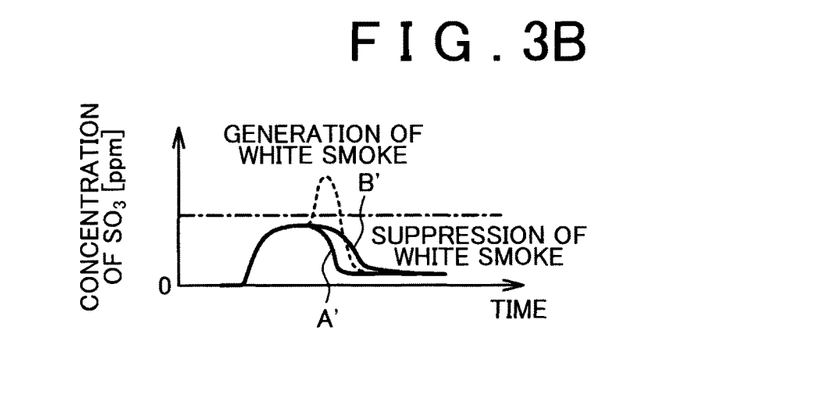
FIG. 3B is a graph illustrating a change in concentration of $SO_3$ in an exhaust gas during the temperature increase suppression control.
Figure 3C:
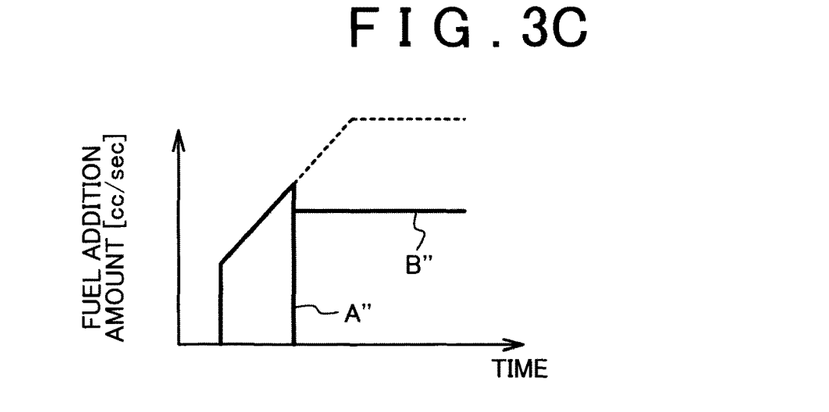
FIG. 3C is a graph illustrating a change in fuel addition amount of a fuel adding valve during the temperature increase suppression control.

Next, the temperature increase suppression control will be described. FIG. 3A is a graph illustrating a change in temperature of the exhaust gas control apparatus during the temperature increase suppression control. FIG. 3B is a graph illustrating a change in concentration of $SO_3$ in the exhaust gas during the temperature increase suppression control. FIG. 3C is a graph illustrating a change in fuel addition amount of the fuel adding valve 24 during the temperature increase suppression control. Furthermore, in FIGS. 3A and 3B, a change in temperature of the exhaust gas control apparatus and a change in concentration of $SO_3$ when the temperature increase suppression control is not executed during the slow regeneration control are indicated by the dotted line, and a change in temperature of the exhaust gas control apparatus and a change in concentration of $SO_3$ when the temperature increase suppression control is executed during the slow regeneration control are indicated by the solid line. Further, in FIG. 3C, a change in fuel addition amount of the fuel adding valve 24 when the temperature increase suppression control is not executed during the slow regeneration control is indicated by the dotted line, and a change in fuel addition amount of the fuel adding valve 24 when the temperature increase suppression control is executed during the slow regeneration control is indicated by the solid line.

If the temperature of the exhaust gas control apparatus continuously increases even after the engine 11 enters the idle operation state when the temperature of the exhaust gas control apparatus is in the temperature range D2, the flow rate of the exhaust gas decreases compared to the value obtained immediately before the idle operation. However, the separation of $SO_3$ continuously occurs, and hence the concentration of $SO_3$ in the exhaust gas increases. Thus, there is a concern that white smoke may be generated. Accordingly, the ECU 30 executes the temperature increase suppression control of suppressing an increase in temperature of the exhaust gas control apparatus during the idle operation when the engine 11 enters the idle operation state in a case where the temperature of the exhaust gas control apparatus is in the temperature range D2 during the slow regeneration control. In the temperature increase suppression control of the embodiment, there is a case where the fuel addition amount of the fuel adding valve 24 is controlled at zero so as to decrease the temperature of the exhaust gas control apparatus during the idle operation. Also, there is a case where the fuel addition amount of the fuel adding valve 24 is controlled so as to maintain the temperature of the exhaust gas control apparatus at the value, obtained immediately before the idle operation, during the idle operation. In FIGS. 3A to 3C, the temperature of the exhaust gas control apparatus is indicated by the curve A, the concentration of $SO_3$ is indicated by the curve A', and the fuel addition amount is indicated by the curve A" in a case where the fuel addition amount is controlled at zero. Further, the temperature of the exhaust gas control apparatus is indicated by the curve B, the concentration of $SO_3$ is indicated by the curve B', and the fuel addition amount is indicated by the curve B" in a case where the temperature of the exhaust gas control apparatus is maintained immediately before the idle operation.

Figure 4:
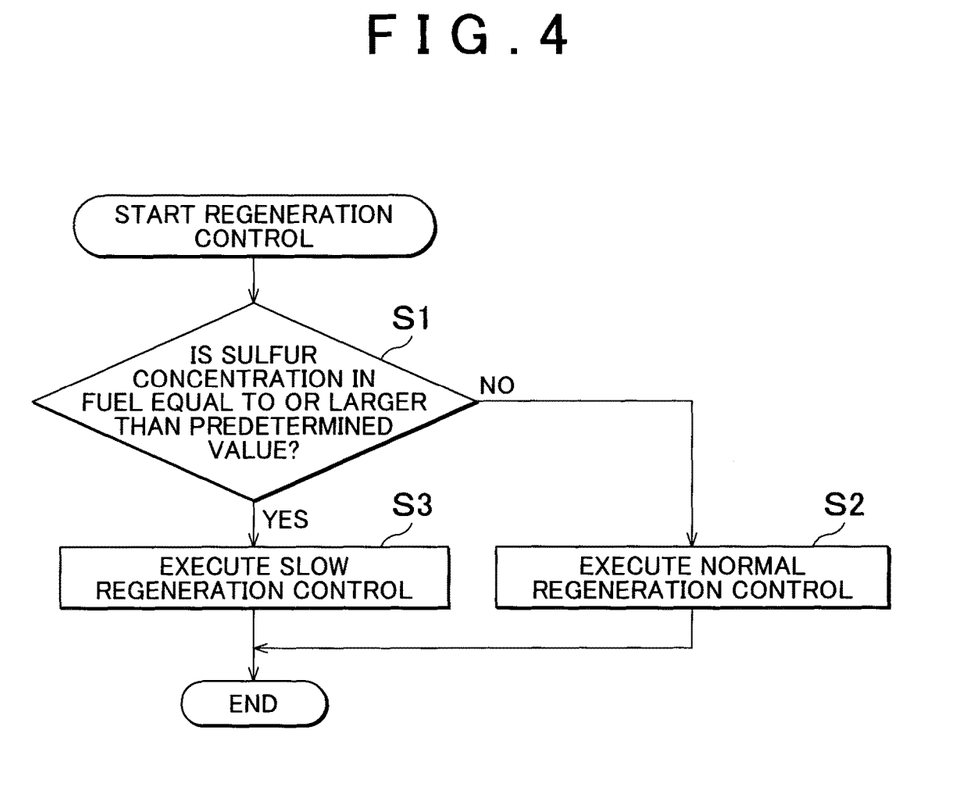
FIG. 4 is a flowchart illustrating an example of a regeneration control.

FIG. 4 is a flowchart illustrating an example of the regeneration control. Furthermore, the regeneration control is started, for example, when the ECU 30 determines that the amount of the particulate matter accumulated on the DPF 21 exceeds a predetermined value. Specifically, the ECU 30 estimates the amount of the particulate matter accumulated on the DPF 21 based on the traveling distance and the like. When the regeneration control is started, the ECU 30 determines whether the sulfur concentration in fuel is a predetermined value or more (step S1). The predetermined value is a value used as a reference for determining whether white smoke is generated by the execution of the normal regeneration control. When a negative determination is made in step S1, the ECU 30 executes the normal regeneration control (step S2). When the sulfur concentration in fuel is low so as to become smaller than a predetermined value, it is considered that the amount of the sulfuric compound accumulated on the DOC 20 and the DPF 21 is small. Thus, white smoke is not easily generated even when the normal regeneration control is executed. When the normal regeneration control ends, the regeneration control ends.

When a positive determination is made in step S2, the ECU 30 executes the slow regeneration control (step S3). If the normal regeneration control is executed when the sulfur concentration in fuel is a predetermined value or more, there is a concern that white smoke may be generated. When the slow regeneration control ends, the regeneration control ends.

Figure 5:
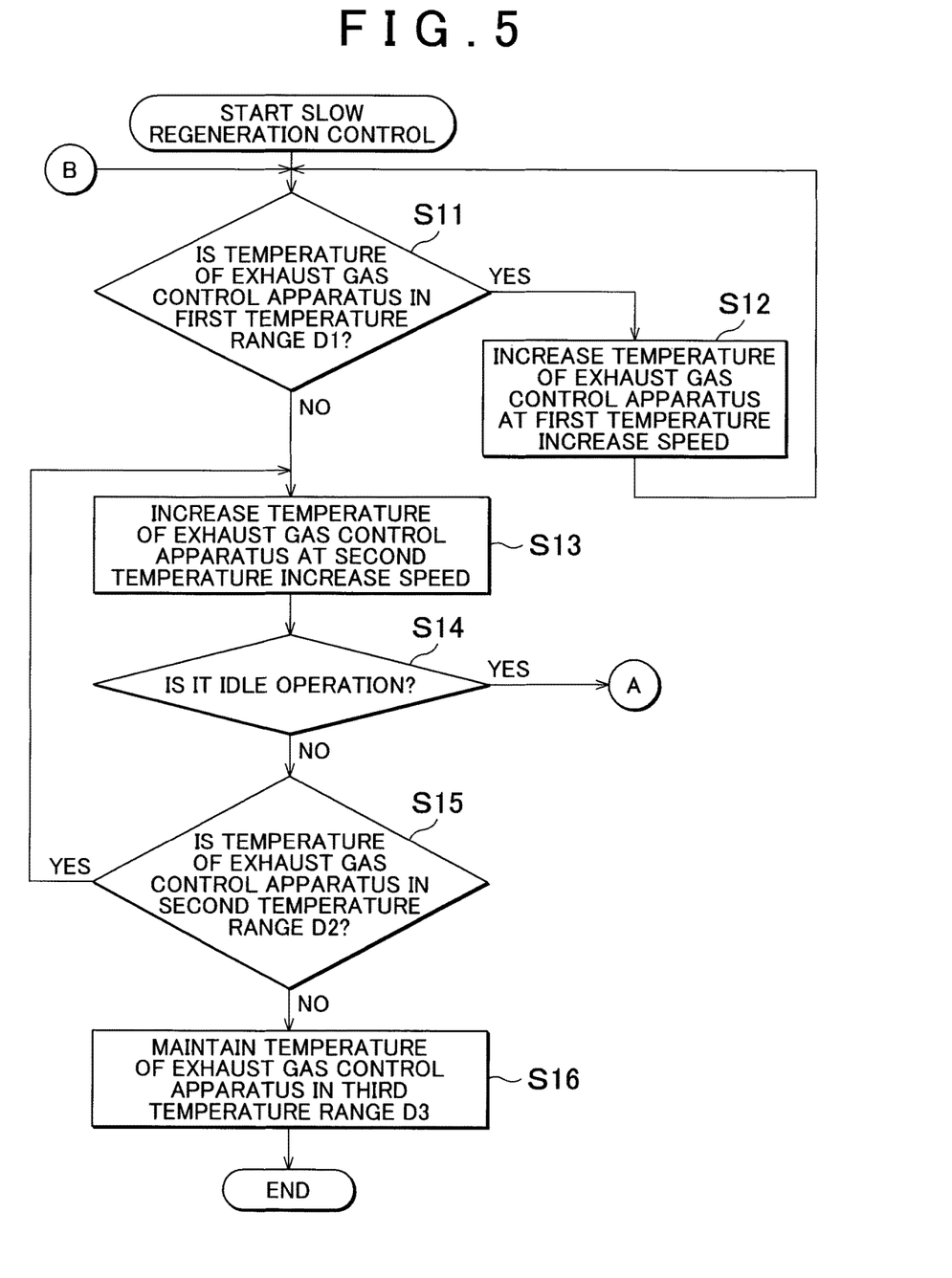
FIG. 5 is a flowchart illustrating an example of a slow regeneration control.
Figure 6:
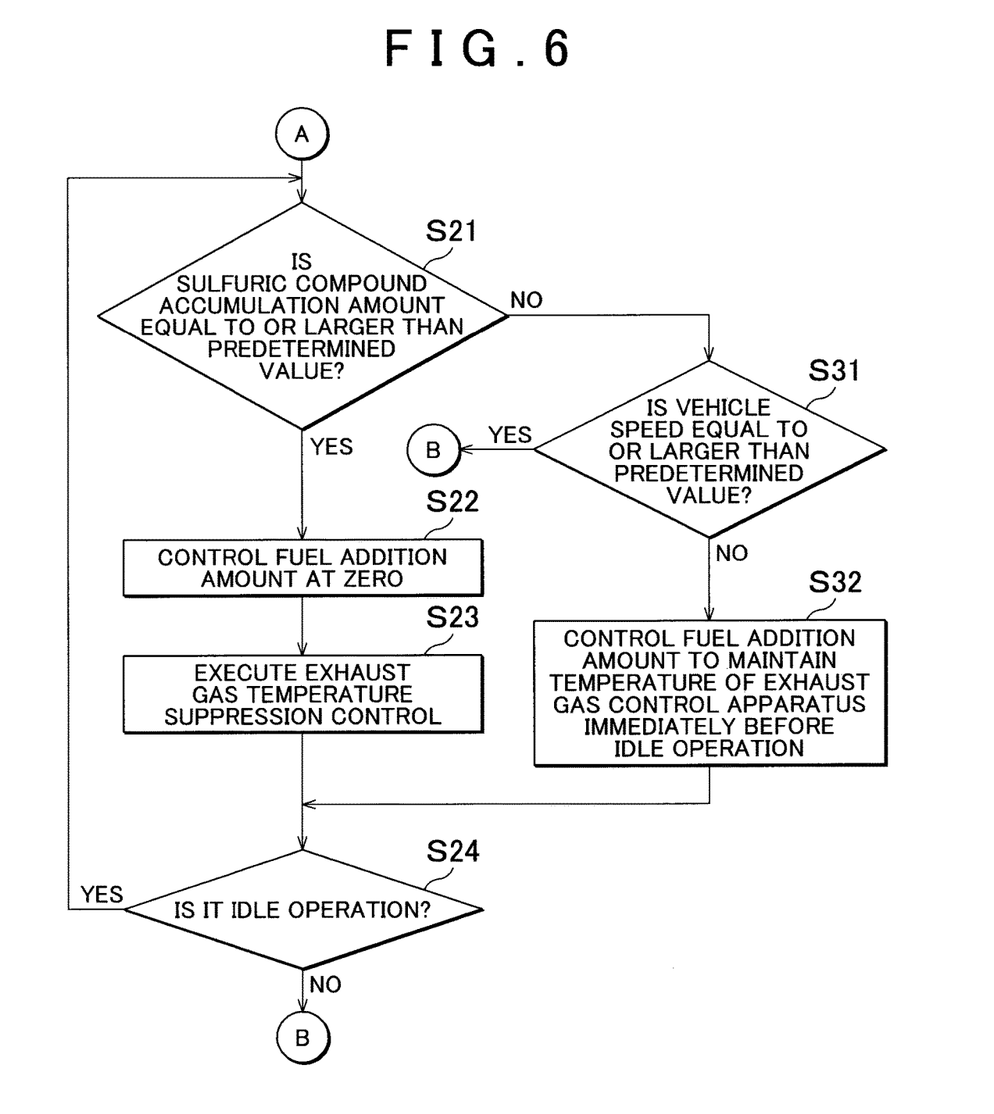
FIG. 6 is a flowchart illustrating an example of the slow regeneration control.

FIGS. 5 and 6 are flowcharts illustrating examples of the slow regeneration control. The ECU 30 determines whether the temperature of the exhaust gas control apparatus is in the temperature range D1 (step S11). When a positive determination is made, the ECU 30 controls the fuel addition amount of the fuel adding valve 24 so as to increase the temperature of the exhaust gas control apparatus at the first temperature increase speed (step S12). Specifically, the ECU 30 sets a first target temperature increase speed so as to increase the temperature of the exhaust gas control apparatus at the first temperature increase speed, and controls the fuel addition amount of the fuel adding valve 24 so as to correspond to the first target temperature increase speed.

When a negative determination is made in step S11, that is, the temperature of the exhaust gas control apparatus is included in not the temperature range D1 but the temperature range D2, the ECU 30 increases the temperature at the second temperature increase speed (step S13). Here, the ECU 30 sets a second target temperature increase speed in response to the sulfur concentration in fuel. The second target temperature increase speed is a target value obtained when the temperature of the exhaust gas control apparatus is increased at the second temperature increase speed. Furthermore, the second target temperature increase speed may be set based on the map that is defined so that the second target temperature increase speed decreases as the sulfur concentration in fuel increases. This is because the sulfuric compound accumulation amount increases as the sulfur concentration in fuel increases. Thus, the sulfuric compound separation amount also increases. Also, this is because the generation of white smoke may be suppressed as the second target temperature increase speed decreases. Further, the ECU 30 may execute a feed-back control for the fuel addition amount of the fuel adding valve 24 based on the actual temperature of the exhaust gas control apparatus so that the temperature of the exhaust gas control apparatus increases at the second temperature increase speed. Thus, it is possible to increase the temperature of the exhaust gas control apparatus at the second temperature increase speed with high precision.

Next, the ECU 30 determines whether the engine 11 enters the idle operation state (step S14). When a negative determination is made in step S14, the ECU 30 determines whether the temperature of the exhaust gas control apparatus is in the temperature range D2 (step S15). When a positive determination is made in step S15, the ECU 30 executes the process after step S13 again. When a negative determination is made in step S15, that is, the temperature of the exhaust gas control apparatus is not in the temperature range D2, the ECU 30 maintains the temperature of the exhaust gas control apparatus at the temperature range D3 during a predetermined period (step S16). The predetermined period is a period that is necessary to burn the particulate matter accumulated on the DPF 21. After maintaining the temperature of the exhaust gas control apparatus in the temperature range D3 during a predetermined period, the ECU 30 ends the slow regeneration control and thus ends the regeneration control.

When a positive determination is made in step S14, that is, the engine 11 enters the idle operation state, the ECU 30 determines whether the sulfuric compound accumulation amount with respect to the exhaust gas control apparatus E is a predetermined value or more (step S21). The predetermined value is a sulfuric compound accumulation amount having a possibility that white smoke may be generated during the idle operation. Furthermore, the ECU 30 may estimate the sulfuric compound accumulation amount based on the value obtained by subtracting the sulfuric compound separation amount obtained before the temperature of the exhaust gas control apparatus reaches the temperature of the exhaust gas control apparatus when the engine 11 enters the idle operation state during the slow regeneration control from the sulfuric compound accumulation amount calculated based on the vehicle traveling distance before the execution of the slow regeneration control.

Figure 7:
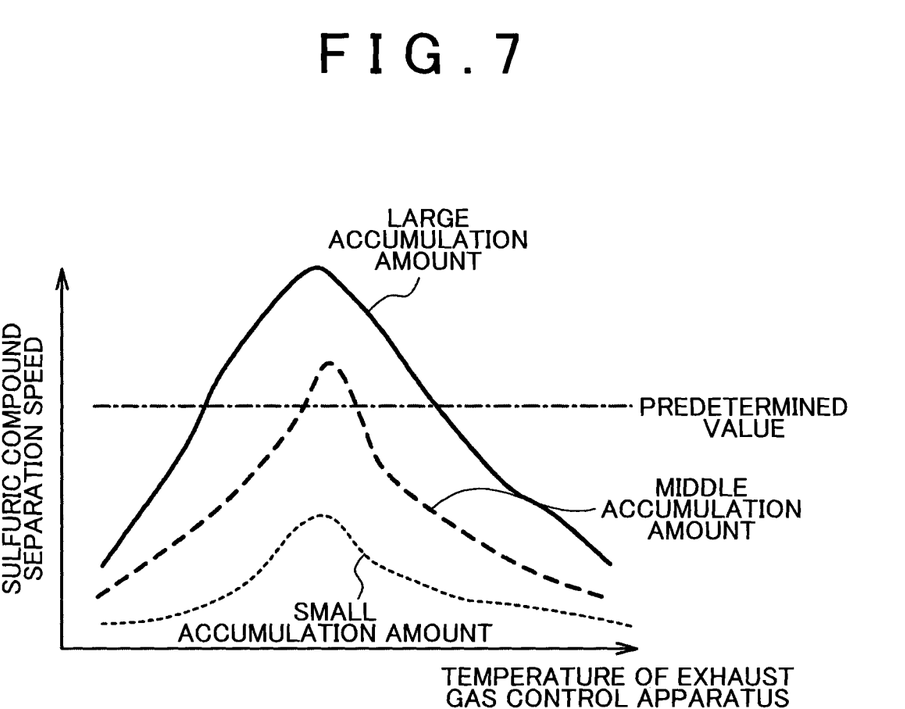
FIG. 7 is a map that defines a relation between a sulfuric compound separation speed and a temperature of the exhaust gas control apparatus.

FIG. 7 is a map that defines a relation between the sulfuric compound separation speed and the temperature of the exhaust gas control apparatus. The sulfuric compound separation speed has a peak about substantially the same temperature of the exhaust gas control apparatus regardless of the accumulation amount. Further, the sulfuric compound separation speed increases as the sulfuric compound accumulation amount increases. Accordingly, there is a high possibility that white smoke may be generated in the idle operation state as the sulfuric compound accumulation amount increases. The predetermined value in step S21 is set based on the sulfuric compound accumulation amount when the sulfuric compound separation speed is fast.

When a positive determination is made in step S21, that is, the sulfuric compound accumulation amount is comparatively large, the ECU 30 controls the fuel addition amount of the fuel adding valve 24 at zero (step S22). Thus, an additional increase in temperature of the exhaust gas control apparatus is suppressed.

Further, the ECU 30 executes an exhaust gas temperature suppression control of suppressing the temperature of the exhaust gas (step S23). Thus, it is possible to suppress an increase in temperature of the exhaust gas control apparatus caused by the exhaust gas. For example, in the exhaust gas temperature suppression control, the temperature of the exhaust gas is decreased by increasing the amount of fresh air introduced into the engine 11 so that the air-fuel ratio is controlled to be lean. For example, the opening degree of the EGR valve Va may be controlled to the closing side, so that the amount of burned gas returned to the engine 11 decreases and the amount of fresh air increases. Alternatively, the throttle valve V may be controlled to the opening side and the variable nozzle vane 18a may be controlled to the closing side, so that the supercharging pressure increases and the fresh air amount increases. Further, the fuel combustion speed in the engine 11 may be increased so as to decrease the temperature of the exhaust gas. For example, the fuel injection timing for the engine 11 may be advanced or the fuel injection pressure may be increased.

The ECU 30 determines whether the engine 11 enters the idle operation state (step S24). When a positive determination is made, the ECU 30 executes the process after step S21 again. When a negative determination is made, the ECU 30 executes the process after step S11 again. In this way, if the engine enters the idle operation state when the sulfuric compound accumulation amount is comparatively large, the fuel addition amount of the fuel adding valve 24 is set to zero during the idle operation and the exhaust gas temperature suppression control is also executed so as to suppress an increase in temperature of the exhaust gas control apparatus. Thus, the generation of white smoke is suppressed.

When a negative determination is made in step S21, that is, the sulfuric compound accumulation amount is comparatively small, the ECU 30 determines whether the vehicle speed is a predetermined value or more (step S31). The vehicle speed is determined based on the value output from the vehicle speed sensor. Here, the predetermined value is a vehicle speed at which the exhaust gas is not visually recognized as white smoke even when the temperature of the exhaust gas control apparatus is increased at the second temperature increase speed in a case where the sulfuric compound accumulation amount is comparatively small as in the negative determination in step S21. For example, the predetermined value is 1 km/h. When a positive determination is made in step S31, that is, the vehicle speed is a certain vehicle speed even in the idle operation state, the ECU 30 executes the process after step S11 again and the temperature of the exhaust gas control apparatus increases at the second temperature increase speed when the temperature of the exhaust gas control apparatus is in the temperature range D2. This is because the exhaust gas is not easily and visually recognized as white smoke even when the temperature of the exhaust gas control apparatus is increased at the second temperature increase speed in a case where the sulfuric compound accumulation amount is comparatively small and the vehicle speed is a certain vehicle speed.

When a negative determination is made in step S31, that is, the vehicle speed is substantially zero, the ECU 30 controls the fuel addition amount of the fuel adding valve 24 so that the temperature of the exhaust gas control apparatus is maintained at the value, obtained immediately before the idle operation, even during the idle operation (step S32). The fuel addition amount of the fuel adding valve 24 is controlled based on the map that is defined so that the fuel addition amount increases as the temperature of the exhaust gas control apparatus immediately before the idle operation increases. Since the temperature of the exhaust gas control apparatus immediately before the idle operation state is maintained, an additional increase in temperature of the exhaust gas control apparatus is suppressed. For this reason, the generation of white smoke is also suppressed. Further, since the temperature of the exhaust gas control apparatus obtained immediately before the idle operation state is maintained when the sulfuric compound accumulation amount is comparatively small as in the negative determination in step S21, the generation of white smoke is suppressed in that the sulfuric compound accumulation amount is comparatively small even when the temperature of the exhaust gas control apparatus slightly increases due to, for example, an unexpected increase in exhaust gas temperature. Furthermore, since a negative determination is made in step S11 and a positive determination is made in step S14, the temperature of the exhaust gas control apparatus is maintained in the temperature range D2 due to the process of step S32.

The curve B" of FIG. 3C indicates a case where the fuel addition amount of the fuel adding valve 24 is controlled so that the temperature of the exhaust gas control apparatus immediately before the idle operation is maintained. Furthermore, in this case, the reason why the fuel addition amount during the idle operation becomes smaller than the fuel addition amount immediately before the idle operation is that the intake air amount during the idle operation becomes smaller than the intake air amount before the idle operation. For this reason, when the fuel addition amount is not decreased in accordance with this state, the fuel addition amount increases with respect to the decreased intake air amount, and hence there is a concern that the temperature of the exhaust gas control apparatus during the idle operation may increase. Accordingly, even when the sulfuric compound accumulation amount is a predetermined value or more or is smaller than a predetermined value, a control is performed so that the fuel addition amount during the idle operation becomes smaller than the fuel addition amount immediately before the idle operation.

Next, the ECU 30 determines whether the current operation state is the idle operation state (step S24), executes the process after step S21 again when a positive determination is made, and executes the process after step S11 again when a negative determination is made. Accordingly, when the idle operation is returned to the normal operation after the execution of the process of step S32, the temperature increases again from the temperature of the exhaust gas control apparatus immediately before the idle operation at the second temperature increase speed. This is because the process of step S13 is executed after a negative determination is made in step S11. Thus, it is possible to suppress the prolongation of the regeneration control and to suppress degradation in fuel efficiency in a case where the temperature of the exhaust gas control apparatus is maintained at a certain temperature even during the idle operation compared to a case where the temperature of the exhaust gas control apparatus is decreased during the idle operation and the temperature of the exhaust gas control apparatus is increased after the idle operation is returned to the normal operation.

As described above, when the current operation state becomes the idle operation state in a case where the temperature of the exhaust gas control apparatus is in the temperature range D2 causing the separation of the sulfuric compound during the slow regeneration control, the generation of white smoke is suppressed by executing the temperature increase suppression control of suppressing an additional increase in temperature of the exhaust gas control apparatus.

Further, as illustrated in step S21, step S22, and step S32, when the sulfuric compound accumulation amount becomes a predetermined value or more, the fuel addition amount is controlled so that the temperature of the exhaust gas control apparatus becomes smaller than that of a case where the sulfuric compound accumulation amount is smaller than a predetermined value. For this reason, when the sulfuric compound accumulation amount is large, the generation of white smoke is first suppressed. Then, when the sulfuric compound accumulation amount is small, it is possible to suppress the prolongation of the slow regeneration control while suppressing the generation of white smoke and hence to suppress degradation in fuel efficiency.

The above-described embodiment is merely used to implement the invention, and the invention is not limited thereto. From the description above, it is obvious that various modifications of the embodiment are included in the scope of the invention and various other embodiments may be employed in the scope of the invention.

In the above-described embodiment, the normal regeneration control and the slow regeneration control are selectively executed as the regeneration control, but only the slow regeneration control may be executed. Further, the invention is not limited to the configuration in which the normal regeneration control is executed when the sulfur concentration in fuel is smaller than a predetermined value and the slow regeneration control is executed when the sulfur concentration in fuel is equal to or larger than a predetermined value. For example, a configuration may be employed in which the sulfuric compound accumulation amount with respect to the exhaust gas control apparatus E is estimated, the normal regeneration control is executed when the estimated accumulation amount is smaller than a predetermined value, and the slow regeneration control is executed when the estimated accumulation amount is equal to or larger than a predetermined value. Further, a configuration may be employed in which the normal regeneration control is executed only when the sulfur concentration in fuel is smaller than a predetermined value and the estimated sulfuric compound accumulation amount is also smaller than a predetermined value and the slow regeneration control is executed in the other cases.

Further, when the sulfuric compound accumulation amount becomes a predetermined value or more in the temperature increase suppression control, the fuel addition amount is decreased compared to a case where the sulfuric compound accumulation amount is smaller than a predetermined value, and then the fuel addition may be continued in any case. Thus, in any case, the prolongation of the slow regeneration control may be suppressed.

Further, in the temperature increase suppression control, the exhaust gas temperature suppression control may be executed at all times or may not be executed. Further, while the fuel addition amount is controlled so that the temperature of the exhaust gas control apparatus obtained immediately before the idle operation is maintained regardless of the sulfuric compound accumulation amount, the exhaust gas temperature suppression control may be executed when the sulfuric compound accumulation amount becomes equal to or larger than a predetermined value and the exhaust gas temperature suppression control may not be executed when the sulfuric compound accumulation amount is smaller than a predetermined value.

The invention claimed is:

1. A control apparatus for an internal combustion engine, the internal combustion engine including an exhaust gas control apparatus provided in an exhaust passageway of the internal combustion engine and a fuel supply apparatus configured to supply fuel to the exhaust gas control apparatus, the control apparatus comprising:
an electronic control unit configured to:
(a) control the supply of fuel by the fuel supply apparatus as a regeneration control such that a temperature of the exhaust gas control apparatus is increased and a particulate matter accumulated on the exhaust gas control apparatus is burned by the fuel, wherein the temperature of the exhaust gas control apparatus is obtained by a temperature sensor;
(b) execute increasing the temperature of the exhaust gas control apparatus at a first temperature increase speed as the regeneration control when the temperature of the exhaust gas control apparatus is in a first temperature range;
(c) execute increasing the temperature of the exhaust gas control apparatus at a second temperature increase speed as the regeneration control when the temperature of the exhaust gas control apparatus is in a second temperature range, the second temperature increase speed being slower than the first temperature increase speed, the second temperature range being higher than the first temperature range;

(d) execute burning the particulate matter by maintaining the temperature of the exhaust gas control apparatus in a third temperature range as the regeneration control when the temperature of the exhaust gas control apparatus is in the third temperature range, the third temperature range being higher than the second temperature range; and (e) control the temperature of the exhaust gas control apparatus during an idle operation so as to be equal to or smaller than the temperature of the exhaust gas control apparatus at a time when the internal combustion engine enters an idle operation state as a temperature increase suppression control when the temperature of the exhaust gas control apparatus during the regeneration control is in the second temperature range and the internal combustion engine is in the idle operation state.

2. The control apparatus according to claim 1, wherein the electronic control unit is configured to decrease an amount of the fuel supply during the idle operation compared to the amount of the fuel supply at the time when the internal combustion engine enters the idle operation state as the temperature increase suppression control.

3. The control apparatus according to claim 1, wherein the electronic control unit is configured to execute an exhaust gas temperature suppression control of suppressing the temperature of the exhaust gas as the temperature increase suppression control.

4. The control apparatus according to claim 1, wherein the electronic control unit is configured not to execute the temperature increase suppression control when the temperature of the exhaust gas control apparatus is in the second temperature range, the internal combustion engine enters the idle operation state, and a vehicle speed is equal to or faster than a predetermined value.

5. The control apparatus according to claim 1, wherein the electronic control unit is configured to, when a sulfuric compound accumulation amount is equal to or larger than a predetermined value, control the temperature of the exhaust gas control apparatus such that the temperature of the exhaust gas control apparatus is lower than the temperature of when the sulfuric compound accumulation amount is smaller than the predetermined value as the temperature increase suppression control, the sulfuric compound accumulation amount is an amount of a sulfuric compound accumulated on the exhaust control apparatus.

6. The control apparatus according to claim 1, wherein the electronic control unit is configured to control an amount of the fuel supplied by the fuel supply apparatus, as the temperature increase suppression control, such that the amount of the fuel supplied is smaller when a sulfuric compound accumulation amount is equal to or larger than a predetermined value than when the sulfuric compound accumulation amount is smaller than the predetermined value.

* * * * *